(No Model.)
F. F. LANDIS.
FLEXIBLE PIPE FOR PNEUMATIC STRAW ELEVATORS.
No. 512,558. Patented Jan. 9, 1894.
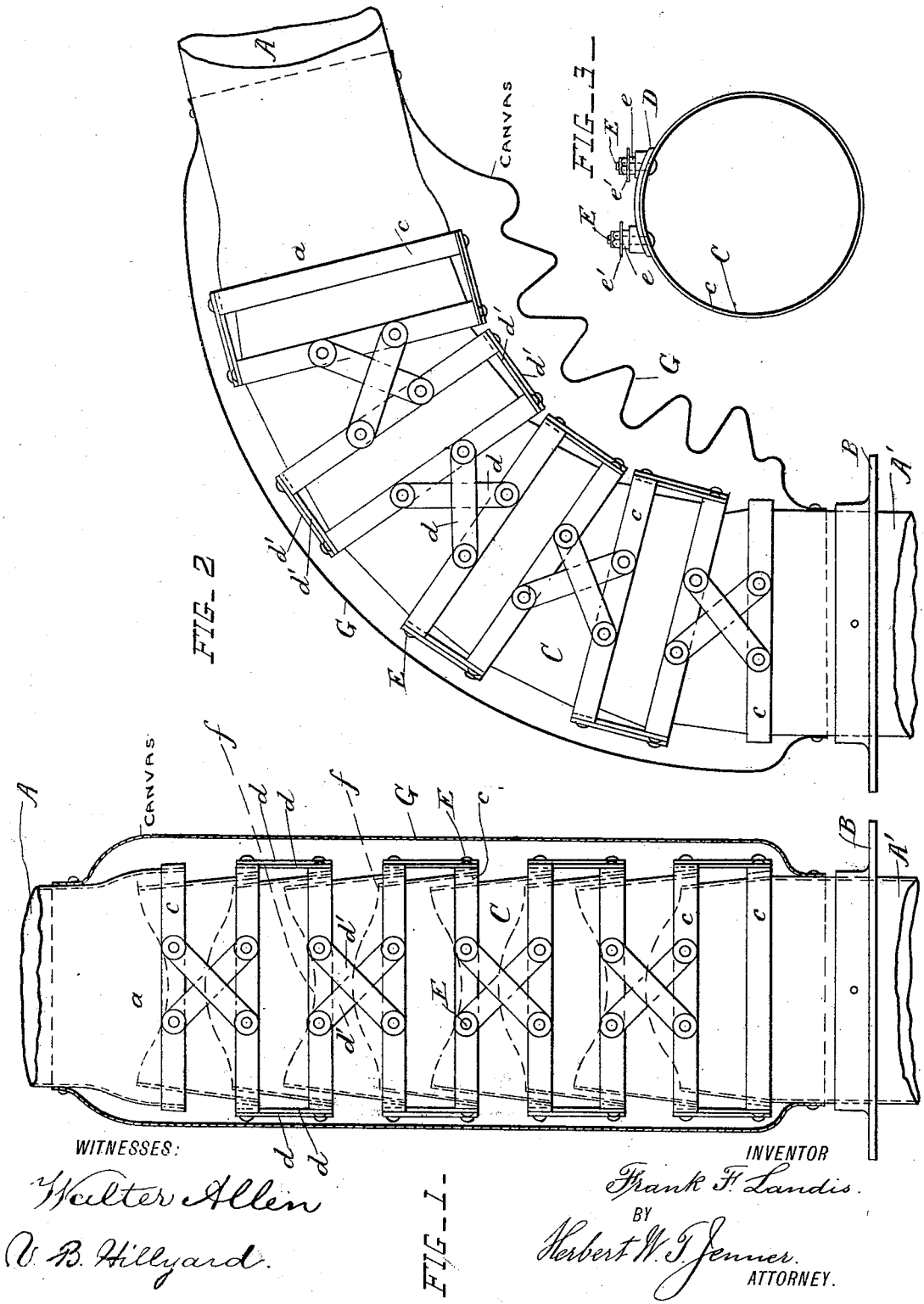
WITNESSES:
Walter Allen
V. B. Hillyard
INVENTOR
Frank F. Landis.
BY
Herbert W. T. Jenner.
ATTORNEY.

UNITED STATES PATENT OFFICE.

FRANK F. LANDIS, OF WAYNESBOROUGH, PENNSYLVANIA.

FLEXIBLE PIPE FOR PNEUMATIC STRAW-ELEVATORS.

SPECIFICATION forming part of Letters Patent No. 512,558, dated January 9, 1894.

Application filed August 9, 1893. Serial No. 482,739. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Flexible Pipes for Pneumatic Straw-Elevators; and I do hereby declare the following to be a full, clear, and exact description of the invention, such as will enable others skilled in the art to which it appertains to make and use the same.

The invention relates to the flexible pipes of pneumatic elevators such as are used in connection with thrashing machines; and it consists in the novel construction and combination of the parts hereinafter fully described and claimed, whereby the discharge pipe is movable in any direction.

In the drawings: Figure 1 is a front view of the pipe showing it in a straight position. Fig. 2 is a side view of the pipe showing it bent over at substantially a right angle. Fig. 3 is a cross-section through a portion of the pipe showing the attachment of the links.

A is the discharge pipe which is made of any convenient length so that the straw of a thrashing machine may be elevated and stacked to any required height. The end of this pipe is preferably provided with a circular enlarged portion $a$ and is provided with a stiffening ring $c$ around its edge.

B is a base portion adapted to be rigidly secured to the frame of the thrashing machine; and A' is a portion of the discharge pipe which is secured to the said base.

In order that the pipe A may be moved in any direction it is connected to the stationary portion A' by a series of overlapping conical segments C. These segments are all alike and each is provided with a stiffening ring $c$ around its larger end. The portion of pipe A' is also provided with a stiffening ring $c$. All the stiffening rings may be dispensed with if the parts of the discharge pipe are strong enough without them, but it is preferable to use the stiffening rings so that the pipe and the segments may be made of very thin sheet iron, as it is desirable that the pipe should be as light as possible. The segments C are connected together in pairs by crossed links $d\, d$, similar crossed links being provided at each side. The links $d\, d$ are arranged in one series and the links $d'\, d'$ are arranged in another series midway of each series of links $d\, d$ around the circumference of the segments. The segments are connected together alternately in pairs by the links $d\, d$ and $d'\, d'$.

D are brackets secured to the stiffening rings $c$ and provided with bosses $e$. The links are pivoted on the bosses $e$, and the bosses are arranged at different distances from the brackets, as shown in Fig. 3, so that the links of each pair can pass each other. The end segments are connected to the portions A A' of the pipe by links, the same as they are connected to each other.

E are bolts or rivets which secure the pipe segments, the stiffening rings and the brackets together; and $e'$ are washers on the upper sides of the links. When the pipe is bent over to the right, as shown in Fig. 2, the links $d\, d$ turn on their pivots but the links $d'\, d'$ are not affected by the motion. When the pipe is bent over forward or backward the links $d'\, d'$ turn on their pivots and the links $d\, d$ are not moved. When the pipe is bent over in intermediate planes all the links are turned on their pivots.

In order to give the segments the requisite freedom of movement the smaller ends of the segments have concave edge portions $f$ at their opposite sides behind the ends of the links $d\, d$ or $d'\, d'$ by which they are connected to the next adjacent segments.

The segments are made larger in diameter than the pipe A so that the area of that portion of the pipe which is formed by the segments may not be materially less when bent over, than the pipe A.

The segments fit very loosely into each other so that they may move freely and in order to prevent the blast of air from driving pieces of straw between the joints of the segments, the segments are inclosed in a tube G of flexible material. The tube G is secured to the parts A and A' in any approved manner, and is preferably made of canvas which is an inexpensive material and substantially air-tight.

The pipe A may be bent over at any angle about the part A' as a center, and may be swung around in a horizontal plane, dispensing with the turntable commonly used to permit the delivery pipe to be swung around.

What I claim is—

1. A flexible pipe consisting of an articulated series of conical segments, in combination with a tube of flexible material inclosing the said segments, substantially as and for the purpose set forth.

2. In a flexible pipe, the combination, with a series of overlapping conical segments, of the crossed links $d\,d$ pivotally connecting the segments in pairs, and the crossed links $d'\,d'$ pivotally connecting the said segments in pairs and arranged alternately of the said links $d\,d$ and between them circumferentially, substantially as shown and described.

3. In a flexible pipe, the combination, with a series of overlapping conical segments provided with concave edge portions at the opposite sides of their smaller ends, of the crossed links $d\;d$ and $d'\;d'$ connecting the said segments alternately in pairs and arranged opposite the said concave portions, substantially as set forth.

4. In a flexible pipe, the combination, with a series of overlapping conical segments provided with stiffening rings at their larger ends, of the brackets provided with bosses $e$, the links pivoted on the said bosses and operatively connecting the said segments, and the bolts securing the said brackets to the segments and keeping the links on the bosses, substantially as set forth.

5. The combination, with a pipe rigidly secured to the frame of a separator, of a delivery pipe for stacking the straw, a flexible pipe connecting the said stationary pipe with the delivery pipe and consisting of a series of articulated segments permitting the delivery pipe to be moved circumferentially and raised and lowered, and a tube of flexible material inclosing the said segments substantially as set forth.

In testimony whereof I affix my signature in presence of two witnesses.

FRANK F. LANDIS.

Witnesses:
HERBERT W. T. JENNER,
ALF. N. RUSSELL.